(12) United States Patent
Hoyle et al.

(10) Patent No.: US 8,667,865 B2
(45) Date of Patent: Mar. 11, 2014

(54) HYBRID TRANSMISSION

(75) Inventors: David J. Hoyle, Wistaston (GB); Simon J. Evans, Malpas (GB); Kevin W. Ford, Stoke-on-Trent (GB)

(73) Assignees: J.C. Bamford Excavators Limited, Uttoxeter (GB); JCB Transmissions, Wrexham (GB)

( * ) Notice: Subject to any disclaimer, the term of this patent is extended or adjusted under 35 U.S.C. 154(b) by 562 days.

(21) Appl. No.: 12/815,237

(22) Filed: Jun. 14, 2010

(65) Prior Publication Data

US 2011/0030505 A1 Feb. 10, 2011

(30) Foreign Application Priority Data

Jun. 15, 2009 (GB) .................................. 0910242.7

(51) Int. Cl.
*F16H 37/06* (2006.01)
(52) U.S. Cl.
USPC ....................................... 74/665 A; 74/665 R
(58) Field of Classification Search
USPC ..... 74/661, 665 R, 665 A, 720; 477/169, 175
See application file for complete search history.

(56) References Cited

U.S. PATENT DOCUMENTS

| | | | | |
|---|---|---|---|---|
| 3,922,931 A | * | 12/1975 | Osujyo et al. ..................... | 74/745 |
| 4,043,227 A | * | 8/1977 | Beals et al. ....................... | 477/69 |
| 4,242,922 A | | 1/1981 | Baudoin | |
| 4,581,949 A | | 4/1986 | Mann et al. | |
| 4,658,662 A | * | 4/1987 | Rundle .............................. | 74/331 |
| 4,667,636 A | | 5/1987 | Oishi et al. | |

(Continued)

FOREIGN PATENT DOCUMENTS

| | | |
|---|---|---|
| DE | 3733883 A1 | 4/1989 |
| DE | 10248400 A1 | 4/2004 |

(Continued)

OTHER PUBLICATIONS

Extended European Search Report for EP 10165868.0, dated Oct. 29, 2010.

(Continued)

*Primary Examiner* — Troy Chambers
*Assistant Examiner* — Alexander Vu
(74) *Attorney, Agent, or Firm* — Marshall, Gerstein & Borun LLP

(57) ABSTRACT

A transmission for a vehicle which includes a ground engaging structure driven from an output member of the transmission is disclosed, the transmission including a first input member connected to a prime mover, and a second input member drivable by the operation of a hydraulic drive motor, and the transmission being operable to transmit drive from the first input member to the output member in mechanical drive mode, and from the second input member to the output member in hydrostatic drive mode, the first input member providing a drive input from the prime mover to a mechanical drive train which includes a gear ratio selection apparatus, and for mechanical drive mode, the gear ratio selection apparatus providing for one of a plurality of alternative gear ratios to be selected by the engagement and/or disengagement of at least one power-shift clutch device, and the second input member being connected via a drive path to the output member, and there being a power-shift clutch device between the hydraulic drive motor and the second input member which is operative when the transmission is in hydrostatic drive mode, to transmit drive established by the operation of the hydraulic drive motor to the second input member.

9 Claims, 2 Drawing Sheets

(56) References Cited

U.S. PATENT DOCUMENTS

| | | | |
|---|---|---|---|
| 5,301,564 A * | 4/1994 | Muller et al. | 74/333 |
| 5,329,828 A * | 7/1994 | Hurth | 74/661 |
| 5,868,640 A | 2/1999 | Coutant | |
| 5,946,983 A | 9/1999 | Brambilla | |
| 6,044,728 A | 4/2000 | Pecceu | |
| 6,361,463 B1 * | 3/2002 | Kojima | 475/79 |
| 6,502,652 B2 * | 1/2003 | Rogg | 180/65.21 |
| 6,631,651 B2 * | 10/2003 | Petrzik | 74/346 |
| 6,755,766 B2 * | 6/2004 | Inoue et al. | 477/71 |
| 6,817,960 B2 * | 11/2004 | Jolliff et al. | 475/83 |
| 6,880,429 B1 * | 4/2005 | Daniel et al. | 74/730.1 |
| 7,320,217 B2 * | 1/2008 | Yasuda et al. | 60/468 |
| 2002/0139597 A1 | 10/2002 | Kinoshita et al. | |
| 2003/0036451 A1 | 2/2003 | Weeramantry et al. | |
| 2006/0032321 A1 | 2/2006 | Aitzetmueller et al. | |
| 2006/0090460 A1 | 5/2006 | Ma et al. | |
| 2006/0145482 A1 * | 7/2006 | Roethler et al. | 290/40 C |
| 2006/0243128 A1 | 11/2006 | Ma et al. | |
| 2008/0245168 A1 * | 10/2008 | Heinzelmann | 74/335 |
| 2008/0295681 A1 | 12/2008 | Ma et al. | |
| 2011/0030505 A1 * | 2/2011 | Hoyle et al. | 74/665 A |

FOREIGN PATENT DOCUMENTS

| | | |
|---|---|---|
| DE | 102006018435 A1 | 11/2007 |
| DE | 102006038093 A1 | 2/2008 |
| EP | 0608415 A1 | 8/1994 |
| EP | 2189666 A1 | 5/2010 |
| GB | 2279776 A | 1/1995 |
| JP | 6300113 A | 10/1994 |
| JP | 2000127781 A | 5/2000 |
| JP | 2006248341 A | 9/2006 |
| WO | WO-2008133805 A2 | 11/2008 |

OTHER PUBLICATIONS

Search Report for GB 1011881.8, dated Oct. 14, 2010.
Search Report for GB 1009908.3, dated Sep. 23, 2010.
Search Report for GB0910242.7, dated Oct. 5, 2009.

* cited by examiner

HYBRID TRANSMISSION

BACKGROUND TO THE INVENTION

This invention relates to a transmission and more particularly to a hybrid transmission for a vehicle, by means of which drive may be transmitted via a mechanical drive train to a ground engaging structure of the vehicle to drive the vehicle, or drive may be transmitted by the operation of a hydraulic motor.

DESCRIPTION OF THE PRIOR ART

In U.S. Pat. No. 5,946,983 a hybrid transmission is suggested in which a mechanical drive train is established by permanently intermeshing gears and selectively engageable clutches of a gear ratio selection apparatus, or from a hydrostatic drive train which includes a hydraulic motor. However the hydrostatic drive train is not distinct from the gear ratio selection apparatus i.e. at least one clutch of the gear selection apparatus needs to be engaged so that hydrostatic drive may be transmitted from the motor to an output member of the transmission.

U.S. Pat. No. 4,242,922 also discloses a hybrid transmission, with a mechanical drive train being established through permanently meshing gears upon the selective engagement of a clutch. The hydrostatic drive train again is not distinct from the gear ratio selection apparatus, but is via a drive shaft which passes though the selectable (disengaged) clutches of the gear ratio selection apparatus.

It is desirable for the gear ratio selection apparatus at least of the mechanical drive train and components of the drive established by the operation of the hydraulic motor to be distinct, so that for example existing successful gear ratio selection apparatus may readily be used as part of a hybrid transmission.

DE102006038093 teaches a transmission in which a mechanical drive train incorporating a gear ratio selection apparatus, is distinct from a hydrostatic drive from a hydraulic motor. A vehicle with such a transmission may be driven in mechanical drive mode for example on the highway, or during working operations where slow, closely controlled speeds are required, in hydrostatic drive mode. However in this prior proposal it is necessary when effecting a change from one drive mode to the other, for the vehicle to be stationery, such as to per sliding dog connectors to be engaged and disengaged as required.

SUMMARY OF THE INVENTION

According to a first aspect of the invention we provide a transmission for a vehicle which includes a ground engaging structure driven from an output member of the transmission. The transmission may include a first input member connected to a prime mover, and a second input member drivable by the operation of a hydraulic drive motor. The transmission may be operable to transmit drive from the first input member to the output member in mechanical drive mode, and from the second input member to the output member in hydrostatic drive mode. The first input member may provide a drive input from the prime mover to a mechanical drive train which includes a gear ratio selection apparatus, and for mechanical drive mode, the gear ratio selection apparatus may provide for one of a plurality of alternative gear ratios to be selected by the engagement and/or disengagement of at least one power-shift clutch device. The second input member may be connected via a drive path to the output member, and there may be a power-shift clutch device between the hydraulic drive motor and the second input member which is operative when the transmission is in hydrostatic drive mode, to transmit drive established by the operation of the hydraulic drive motor to the second input member.

The apparatus of the invention provides an improved hybrid transmission in which at low speeds when maximum control is required for maneuvers, e.g. where the vehicle is a working machine, during working operations, drive to the ground engaging drive structure is effected by operation of the hydraulic drive motor, whilst at higher speeds, e.g. in the case of a working machine, at road speeds, drive may be effected via the mechanical drive train, with a selected gear ratio. By virtue of the use of power-shift clutch devices, the transmission may be changed between mechanical and hydrostatic drive modes whilst the vehicle is traveling, for example at a threshold speed.

By "power-shift" clutch devices we mean devices which include an actuator to move input and output parts into and out of frictional engagement to transmit or interrupt drive respectively. It will be appreciated that friction material is usually employed which permits slippage between the input and output parts when in a transition state between being fully frictionally engaged and fully disengaged. Thus drive may be continuously transmitted during change over between mechanical and hydrostatic drive modes, by simultaneously engaging and disengaging the various power-shift clutch devices though their transition states.

The operation of the transmission may be controlled by a controller. The controller may operate the power-shift clutch device or devices of the mechanical drive train to select a gear ratio, for example automatically depending on vehicle speed, and load, and/or the controller may operate the power-shift clutch device or devices of the mechanical drive train to select a gear ratio in response to an input from an operator.

In each case the controller may operate the power-shift clutch device or devices of the mechanical drive train and the power-shift clutch device between the hydraulic drive motor and the second input member, to change between mechanical and hydrostatic drive modes in response to the vehicle being determined to be traveling at a threshold speed and depending upon whether the vehicle is accelerating or decelerating.

The hydraulic drive motor of the transmission, at least when the transmission is in hydrostatic drive mode, may be provided with pressurized hydraulic fluid to drive the motor, from a hydraulic pump which is driven by the prime mover.

Preferably the motor and the pump are each variable capacity, e.g. swash plate, devices. The pump preferably is permanently connected to the prime mover i.e. the pump is driven regardless of whether drive is transmitted though the mechanical gear train or is established by the operation of the hydraulic drive motor. For example, the hydraulic pump may be permanently connected to the first input member e.g. by permanently meshing transmission gears.

The output member of the transmission may be connected to wheels and/or tracks of the ground engaging drive structure, directly or via one or more further transmission component as required.

In one example, the mechanical drive train includes a gear fixed to rotate with the first input member and which is in permanent mesh with a gear fixed to rotate with a first lay shaft, a first power-shift clutch device being engageable to connect the first lay shaft to a drive shaft, and the drive shaft having a gear fixed to rotate with the drive shaft and in permanent mesh with a gear fixed to rotate with a second lay shaft, and a second power-shift clutch device being engageable to connect the second lay shaft to the first input member.

Such a transmission may thus have at least two gear ratios, selectable by the engagement and disengagement, e.g., in tandem, of the first and second power-shift clutch devices of the mechanical gear train, and preferably at least three mechanical gear ratios, with there being a corresponding number of power-shift clutch devices of the mechanical drive train, for the number of selectable gear ratios.

The drive shaft may drive the output member via permanently meshing gears with the drive shaft and the output member in line. For example the drive shaft and the output member may be one.

The drive path along which drive is transmitted from the second input member to the output member may include at least one pair of permanently meshing gears.

In one embodiment the hydraulic drive motor includes a motor drive shaft which, when the power-shift clutch device between the hydraulic drive motor and the second input member is engaged, is coupled directly to the second input member, which may thus be in line with the hydraulic drive motor. In another example though there may be a hydraulic drive train which includes a gear which is carried by a motor drive shaft of the hydraulic drive motor, and the gear being fixed to rotate with the motor drive shaft, the gear being connected via at least one permanently meshing gear of the hydraulic drive train to a hydraulic drive train lay shaft, the power-shift clutch device between the hydraulic drive motor and the second input member when engaged, coupling the hydraulic drive train lay shaft to the second input member to effect hydrostatic drive.

According to a second aspect of the invention we provide a method of operating a transmission for a vehicle which includes a ground engaging structure driven from an output member of the transmission. The transmission may include a first input member connected to a prime mover, and a second input member drivable by the operation of a hydraulic drive motor. The transmission may be operable to transmit drive from the first input member to the output member in mechanical drive mode, and from the second input member to the output member in hydrostatic drive mode. The first input member may provide a drive input from the prime mover to a mechanical drive train which includes a gear ratio selection apparatus, and for mechanical drive mode, the gear ratio selection apparatus may provide for one of a plurality of alternative gear ratios to be selected by the engagement and/or disengagement of at least one power-shift clutch device. The second input member may be connected via a drive path to the output member, and there may be a power-shift clutch device between the hydraulic drive motor and the second input member which is operative when the transmission is in hydrostatic drive mode, to transmit drive established by the operation of the hydraulic drive motor to the second input member. The method may include operating the transmission in hydrostatic drive mode with the power-shift, hydrostatic drive, clutch device engaged and no gear ratio selected by the gear ratio selection apparatus, and while the vehicle is still traveling, selecting a gear ratio of the mechanical drive train by engaging or disengaging at least one power-shift clutch device of the gear ratio selection apparatus and disengaging the power-shift, hydrostatic drive, clutch device and continuing to drive the vehicle, in mechanical drive mode.

BRIEF DESCRIPTION OF THE DRAWINGS

Embodiments of the invention will now be described with reference to the accompanying drawings in which:—

DESCRIPTION OF THE PREFERRED EMBODIMENTS

Figure 1:
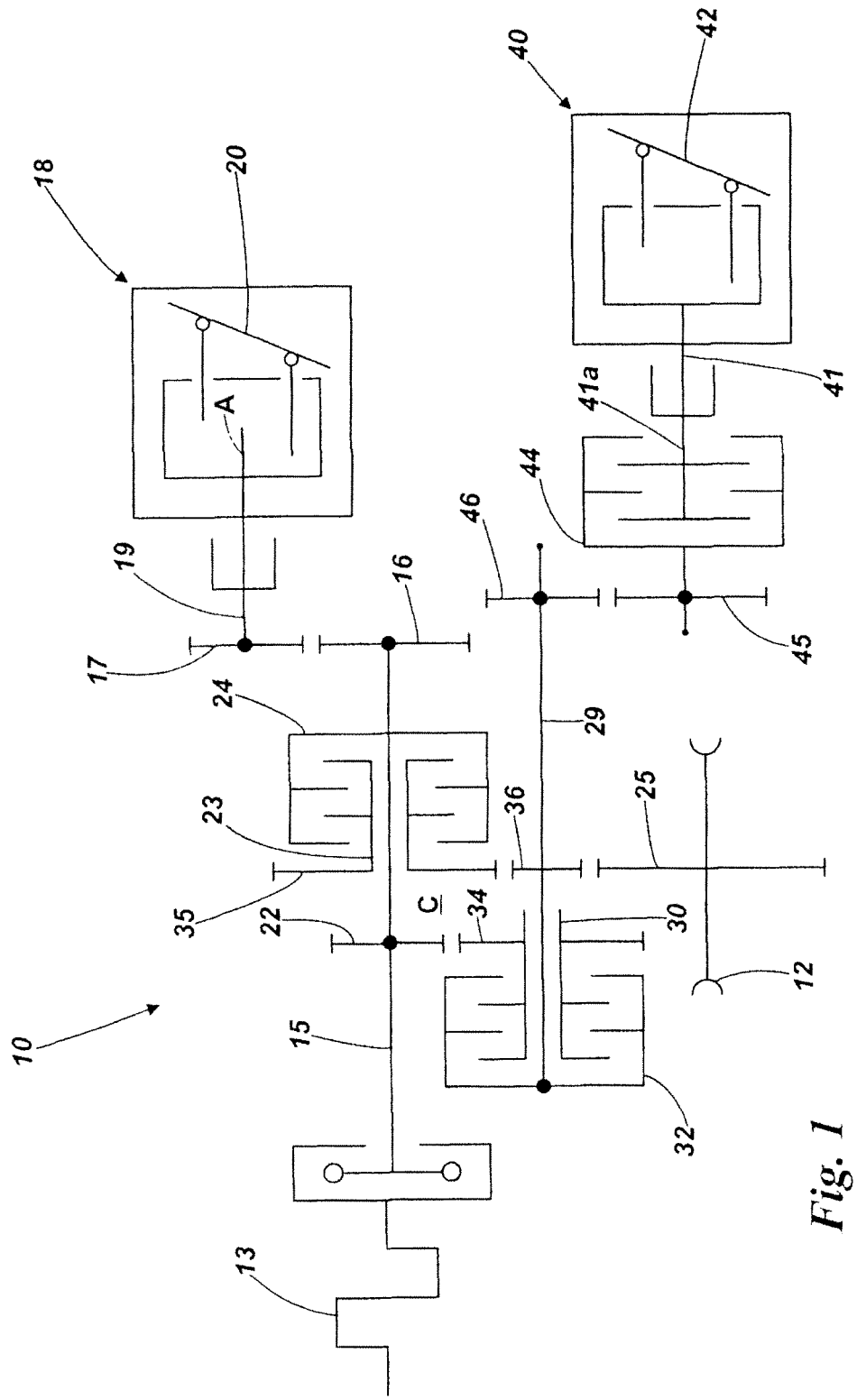
FIG. 1 is an illustrative diagram of a transmission in accordance with the present invention, indicating a prime mover and ground engaging driven structure of a vehicle.

Referring to FIG. 1, a transmission 10 is provided for transmitting drive to a ground engaging driven structure 12 which may be wheels and/or tracks of a vehicle. In the example the vehicle is a working machine which is driven from location to location on the ground engaging driven structure 12, and which may perform working operations such as lifting, loading and moving earth, agricultural and other materials at such location.

The vehicle includes a prime mover 13, typically a diesel engine, whose output drive shaft is connected to (or integral with) a first input member 15 of the transmission 10. In the example, the first input member is a first drive shaft 15 of the transmission 10.

The first drive shaft 15 carries a drive take-off gear 16 which is fast with and rotates with the shaft 15, the drive take-off gear 16 being in permanent mesh with a driven gear 17 which is fast with a hydraulic pump 18 input shaft 19. Thus whenever the prime mover 13 rotates the first input member 15 i.e. whenever the engine 13 is running, the hydraulic pump 18 will be driven.

However the pump 18 is a variable capacity device, such as a swash plate pump, whose output can be varied between a maximum when a swash plate 20 thereof is at a maximum angle, and a minimum or zero output when the swash plate 20 is generally perpendicular to a pump axis A.

The transmission 10 includes a mechanical drive train by which drive may be transmitted from the prime mover 13 to an output member 25 which is connected to the ground engaging driven structure 12, and a drive path to effect drive when a hydraulic drive motor 40 is operated.

The mechanical drive train includes a gear ratio selection apparatus C by which alternative gear ratios between the first input member/first drive shaft 15 and the output member 25 can be selected.

The gear ratio selection apparatus C includes a first gear 22 carried by and fixed to rotate with the first input member 15, and a first lay shaft 30 carried on a second drive shaft 29. A second lay shaft 23 carried on the first input member 15 can be coupled to rotate together with the first input member/first drive shaft 15, when a power-shift clutch device 24 is engaged, but when the power-shift clutch device 24 is disengaged, the second lay shaft 23 is free to rotate on the first drive shaft 15.

The second drive shaft 29 of the gear ratio selection apparatus C is generally parallel to the first drive shaft 15. The first lay shaft 30 carried on the second drive shaft 29 is coupled to rotate with the second drive shaft 29 when a further power-shift clutch device 32 is engaged. When the further power-shift clutch device 32 is disengaged the first lay shaft 30 is free to rotate on the second drive shaft 29.

The first lay shaft 30 carries a second gear 34 which is in permanent mesh with the first gear 22 carried with the first drive shaft 15 and provides one selectable gear ratio. The second lay shaft 23 carries a third gear 35 which is in permanent mesh with a fourth gear 36 which is fast with the second drive shaft 29 and provides another selectable gear ratio.

Thus mechanical drive from the input member/first drive shaft 15 to the output member 25 is effected when the gear ratio selection apparatus C is in an operative state, and the transmission is in mechanical drive mode, either by engaging the further power-shift clutch device 32, when drive will be via the first and second permanently meshing gears 22, 34, or alternatively by engaging the power-shift clutch device 24 when drive will be via the third and fourth permanently meshing gears 35, 36. The respective power-shift clutch devices 24, 32 are never simultaneously fully engaged, but may both be in a transition state between being fully engaged and fully disengaged, to permit of a smooth transition between different gear ratios, so that drive is not interrupted during gear ratio changes.

When neither power-shift clutch device 24, 32 is engaged and thus the gear ratio selection apparatus C is in an inoperative state, no drive is transmitted from the first input member/first drive shaft 15 to the output member 25. Nevertheless, the second drive shaft 29 will be driven when drive is transmitted to the output member 25 in hydrostatic drive mode, by the operation of a hydraulic drive motor 40.

Whether either of the power-shift clutch devices 24, 32 of the gear ratio selection apparatus C are engaged or not, the hydraulic pump 18 is permanently driven via the first drive shaft 15, permanently meshing gears 16, 17 and the pump input shaft 19.

The hydraulic drive motor 40 is a variable capacity device like the pump 18, and in the example is again a variable angle swash plate device. The motor 40 is driven in use by pressurized hydraulic fluid generated by the pump 18, the speed of rotation of a motor output shaft 41 being dependent upon the volume of the pumped fluid and the swash plate 42 angle.

The motor output shaft 41 is connected to an input part 41a of a further power-shift clutch device 44. An output part is connected to a second input member 45 of the transmission 10. When the power-shift clutch device 44 is disengaged, no drive is transmitted from the motor output shaft 41 beyond the further power-shift clutch device 44. However when the power-shift clutch device 44 is engaged, drive is transmitted by the second input member 45 to the transmission 10, which second input member 45 in the example is a gear on a shaft, which gear is in permanent mesh with a further gear 46 carried on and fast with the second drive shaft 29. The second input member 45 is separate from and distinct from the gear change selection apparatus C, as is the drive path to the output member 25.

The hydrostatic drive, power-shift clutch device 44 is only operated to transmit drive to the second input member 45 of the transmission 10 when the power-shift clutch devices 24, 32 of the gear ratio selection apparatus C are both disengaged i.e. the gear ratio selection apparatus C is in an inoperative state. At slow vehicle speeds when maximum speed control is desired, for example while the vehicle/working machine performs working operations, the gear ratio selection apparatus C is controlled, as explained below to be in its inoperative state and drive to the ground engaging driven structure 12 is solely effected by engaging the hydrostatic drive, power-shift clutch device 44, and operating the drive motor 40. At higher vehicle speeds, for example when the vehicle is being driven on a road between work locations, drive may be effected via the mechanical drive train, by the operator, or an automatic transmission controller, disengaging hydrostatic drive mode, and selecting an appropriate gear ratio for the vehicle speed. Variation in vehicle speed when driven by the mechanical drive train may be effected by either or both selecting a gear ratio and/or adjusting the engine 13 speed.

Typically during hydrostatic drive by the hydrostatic motor 40, the engine 13 or other prime mover is operated at a generally fixed speed optimum for torque and efficiency, in order to drive the pump 18. Variation in vehicle drive speed may be achieved by adjusting the angle of one or other of the swash plates 20, 42 of the pump 18 and/or motor 40.

During hydrostatic drive, when the gear ratio selection apparatus C is inoperative, nevertheless drive is transmitted to the output member 25 via a drive path which includes the second drive shaft 29 which carries the fourth permanently intermeshing gear 36 of the mechanical drive train, and through the fourth gear 36 which in this example is the final gear of the mechanical drive train. However hydrostatic drive is effected independently of the gear ratio selection apparatus C which is inoperative i.e. is not transmitting any drive from the first input member/first drive shaft 15 to the output member 25.

In the example of FIG. 1, the gear ratio selection apparatus C has only two alternative gear ratios which may be selected i.e. via first and second gears 22, 34, and via third and fourth gears 35, 36. In another example, more than two selectable gear ratios may be provided by appropriate pairs of permanently intermeshing gears, e.g. with a gear of each such further pair being fixed to rotate with the first or second drive shaft 15, 29 or another drive shaft, and the other gear of the further intermeshing pair being fixed to rotate with a further lay shaft.

The pump 18 need not be located where indicated, but for an alternative geometry transmission 10 package, the pump 18 may be otherwise located but preferably the pump 18 is permanently driven by the prime mover 13. For example the pump 18 may be driven from a drive take-off gear provided on the input member 15 closer to the prime mover 13, for example between the prime mover 13 and the first gear 22.

The hydraulic drive motor 40 need not be located as indicated, but may otherwise be coupled to transmit drive via the second input member 45 to the output member 25 when the hydrostatic drive, power-shift clutch device 44 is engaged. Particularly where the gear ratio selection apparatus C has one or more additional pairs of permanently intermeshing gears, the second input member 45 may not drive the output member 25 through the fourth gear 36, but an alternative drive path may be provided. However the final gear of the mechanical drive train will preferably always be rotated by the operation of the hydraulic drive motor 40, as may components of the gear ratio selection apparatus C albeit that no drive will be transmitted back to the input member/first drive shaft 15 because of the disengaged power-shift clutch devices 24, 32 of the mechanical drive train.

Figure 2:
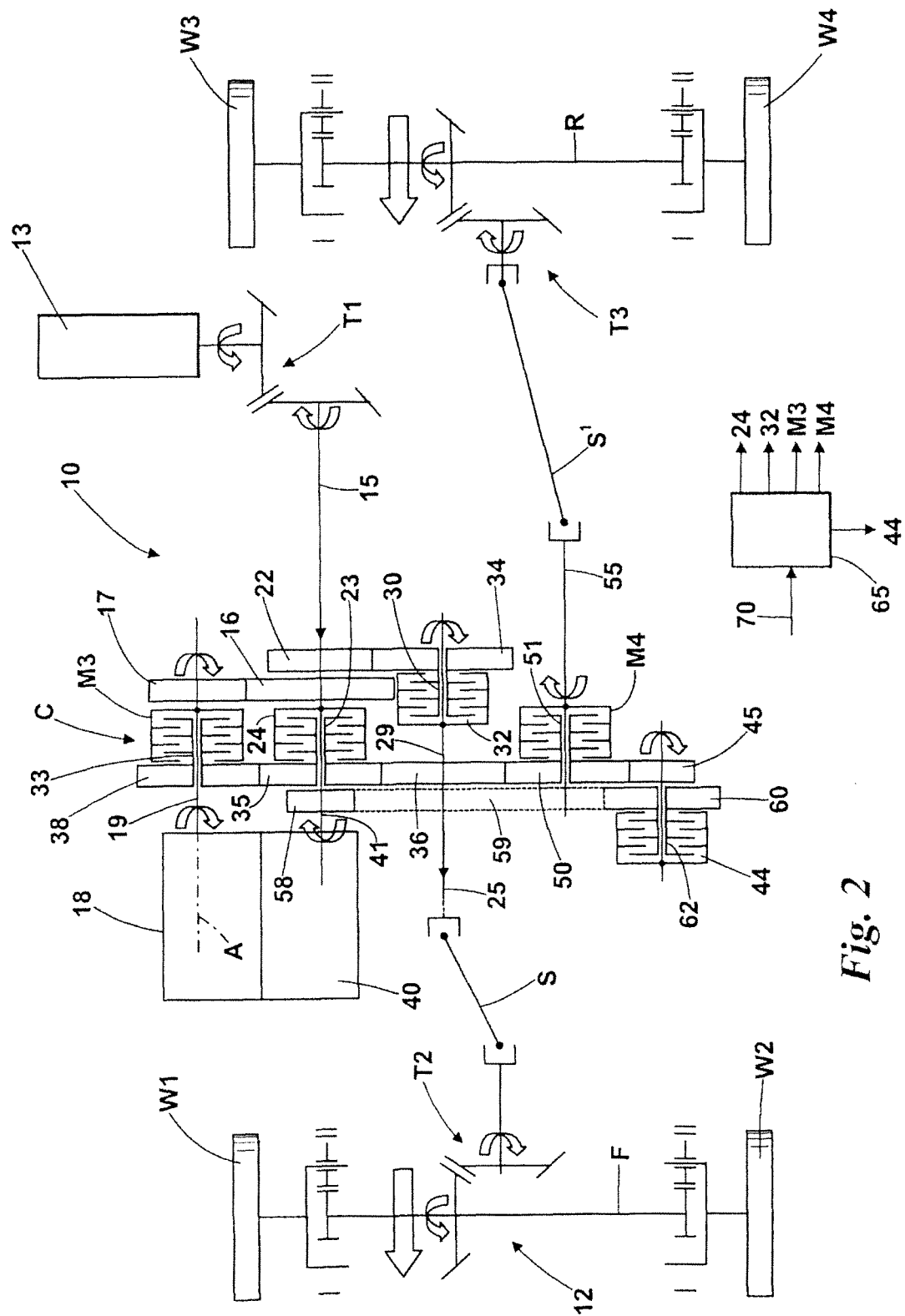
FIG. 2 is an illustrative diagram of another transmission in accordance with the present invention.

Referring now to FIG. 2, there is shown an alternative transmission 10, again for a vehicle. Similar parts to those depicted in FIG. 1 are given the same references.

In this example, the gear ratio selection apparatus C is capable of selecting three alternative gear ratios when the transmission 10 is operated in mechanical drive mode.

A first gear ratio is selectable by engaging a first power-shift clutch device 32, so that drive is transmitted from the first input member 15, through first and second permanently meshing gears 22, 34 carried respectively to rotate with the first input member 15 and a first lay shaft 30, to a first drive shaft 29. The first drive shaft 29 is in line with, and in fact one with the output member 25.

A second gear ratio is selectable by alternatively engaging a second power-shift clutch device 24 of the mechanical drive train so that drive is transmitted from the first input member 15, through third and fourth permanently meshing gears 35, 36 carried respectively to rotate with a second lay shaft 23, and the first drive shaft 29, to the first drive shaft 29.

A third gear ratio is selectable by alternatively engaging a third power-shift clutch device M3 of the mechanical drive train so that drive is transmitted from the first input member 15, via the permanently meshing gears 16, 17 which transmit drive to the hydraulic pump 18, and which are carried respectively to rotate with the first input member 15 and the pump shaft 19, and a third lay shaft 33 of the mechanical drive train. The third lay shaft 33 carries a fifth gear 38 which is in permanent mesh with the third gear 35 carried on the second lay shaft 23.

In this example, the first input member 15 is driven via a gear train T1 from the engine 13 which is transversely mounted of the vehicle. The output member 25 of the transmission 10 is connected via drive shafts S and a further gear train T2 to drive an axle F carrying front wheels W1, W2 of the ground engaging driven structure 12.

The fourth gear 36 of the mechanical drive train which is carried to rotate with the first drive shaft 29 and hence the output member 25, is in permanent mesh with a seventh gear 50 which is carried on a fourth lay shaft 51. A fourth power-shift clutch device M4 is provided which when engaged, couples the fourth lay shaft 51 to a four wheel drive, second output member 55, which is coupled in turn via a shaft S' and yet further gear train T3, to a rear axle R which carries rear wheels W3, W4. Thus two or four wheel drive may be selected upon engaging the fourth power-shift clutch device M4 regardless of whether the transmission 10 is in mechanical drive mode, and with any selected gear ratio, or hydrostatic drive mode as will now be explained.

When all of the first, second and third power-shift clutch devices 32, 24, and M3 are disengaged so that no drive is transmitted from the first input member 15 to the output member 25 (although the first and second gears 22, 34 may be driven parasitically), hydrostatic drive may be engaged by engaging a hydrostatic drive power-shift clutch device 44 which is provided between the hydraulic motor 40 and a second input member 45 which again is a fixed gear carried on a stub shaft.

In this example, the hydraulic pump 18 and hydraulic motor 40 are provided as an integrated unit, but could be separate units, as required.

In this example there is a gear train of permanently meshing gears between the motor output shaft 41 and the output member 25. This includes a motor output gear 58 which is carried to rotate with the motor shaft 41, an idler gear 59 which is in the example mounted on a stub shaft parallel to the output member 25, but could be mounted freely to rotate on the output member 25 as required, and drive gear 60 which is carried on a fifth lay shaft 62 which provides an input part to the hydrostatic drive, power-shift clutch device 44.

The second input member 45 is coupled to rotate with the fifth lay shaft 63 when the hydrostatic drive, power-shift clutch device 44 is engaged. The second input member 45 is in permanent mesh with the seventh gear 50 which is in turn in permanent mesh with the fourth gear 36 which rotates with the first drive shaft 29/output member 25.

The various power-shift clutch devices 32, 24, M3, M4, and 44 are all controlled by a controller 65. Each power-shift clutch device will have an actuator which in this example, when energized e.g. with an electrical or preferably hydraulic signal, by the controller 65, engages the respective clutch device, typically against a spring restoring force which disengages the respective clutch device when de-energized.

As mentioned above, the power-shift clutch devices are controlled so that either a selected one of the gear ratio selection power-shift clutch devices 24, 32, M3 is engaged during mechanical drive, whilst the hydrostatic drive, power-shift clutch device 44 is disengaged, or all of the gear ratio selection power-shift clutch devices 24, 32, M3 are disengaged when the hydrostatic drive, power-shift clutch device 44 is engaged to effect hydrostatic drive.

The four wheel drive power-shift clutch device M4 may be engaged when desired to effect four wheel drive.

Being power-shift clutch devices 24, 32, M3, M4, drive need not be interrupted when changing between drive modes and/or gear ratios as each such power-shift clutch device will have a transition state in which slippage between respective input and output parts of a clutch device is permitted, when changing between fully engaged and fully disengaged states, as is well known in the art.

The controller 65 may respond to an input signal 70 to engage/disengage respective power-shift clutch devices.

In one example, the input signal 70 may be manually generated by an operator operating vehicle transmission controls, or the input signal 70 may be indicative of the vehicle's speed so that the driving mode may be changed between mechanical drive mode and hydrostatic drive mode automatically at a vehicle threshold speed e.g. of a few kilometers per hour.

For example, when the vehicle accelerates from standstill, the vehicle speed will be below the threshold and the controller 65 may select hydrostatic drive mode by engaging the hydrostatic drive, power-shift clutch device 44, and disengaging or maintaining disengagement of the gear ratio selection power-shift clutch devices 24, 32, M3 of the mechanical drive train. The input signal 70 may be a continuous input from a speed sensor for example, and as the vehicle accelerates to the threshold speed this controller 65 may respond to the threshold speed being reached by changing drive mode to mechanical drive mode by disengaging the hydrostatic drive mode power-shift clutch 44 and engaging a (lowest speed ratio) selected gear ratio power-shift clutch device e.g. the first clutch device 32.

As the vehicle continues to accelerate, the controller 65 may effect a change in selected gear ratio by engaging a different gear ratio selection power-shift clutch device of the mechanical drive train, and disengaging the then engaged power-shift clutch device.

As the vehicle slows down e.g. from a cruising speed e.g. when driven on the road, the controller 65 may select a lower gear ratio as a lower speed threshold is reached, and when the vehicle has slowed sufficiently, below a drive mode change threshold speed, hydrostatic drive mode may again be effected and mechanical drive mode suspended.

In another example, the input 70 to the controller 65 to change drive mode or gear ratio may be effected by an intelligent speed sensor only as a threshold speed is reached, and depending upon whether the vehicle is accelerating or decelerating.

In each case an operator may select two or four wheel drive by disengaging/engaging the four wheel drive power-shift clutch device M4, or this too may be selected automatically by the controller 65 according to programmed logic.

The invention claimed is:

1. A transmission for a vehicle which includes a ground engaging structure driven from an output member of the transmission, the transmission including a first input member connected to a prime mover, and a second input member drivable by the operation of a hydraulic drive motor, and the transmission being operable to transmit drive from the first input member to the output member in mechanical drive mode, and from the second input member to the output member in hydrostatic drive mode, the first input member providing a drive input from the prime mover to a mechanical drive train which includes a gear ratio selection apparatus, and for mechanical drive mode, the gear ratio selection apparatus providing for one of a plurality of alternative gear ratios to be selected by the engagement or disengagement of each of a plurality of power-shift clutch devices, and the second input member being connected via a drive path to the output member, the mechanical drive train including a gear fixed to rotate with the first input member and which is in permanent mesh with a gear fixed to rotate with a first lay shaft, a first one of the plurality of power-shift clutch devices being engageable to connect the first lay shaft to a drive shaft, the drive shaft having a gear fixed to rotate with the drive shaft and in permanent mesh with a gear fixed to rotate with a second lay shaft, and a second one of the plurality of power-shift clutch devices being engageable to connect the second lay shaft to the first input member, and a third one of the power-shift clutch devices disposed between the hydraulic drive motor and the second input member and being operative when the transmission is in hydrostatic drive mode, to transmit drive established by the operation of the hydraulic drive motor to the second input member, and wherein the hydraulic drive motor of the transmission, when the transmission is in hydrostatic drive mode, is provided with pressurized hydraulic fluid to drive the hydraulic drive motor from a hydraulic pump, the hydraulic pump being driveable by the prime mover, and wherein the hydraulic drive motor and the hydraulic pump are each variable capacity devices.

2. The transmission according to claim 1 wherein the hydraulic pump is permanently connected to the prime mover.

3. The transmission according to claim 2 wherein the hydraulic pump is permanently connected to the first input member via permanently meshing transmission gears.

4. The transmission according to claim 1 wherein the output member of the transmission is connected to wheels or tracks of the ground engaging driven structure, directly or via one or more further transmission components.

5. The transmission according to claim 1 wherein the drive shaft drives the output member via permanently meshing gears.

6. The transmission according to claim 1 wherein the drive path along which drive is transmitted from the second input member to the output member includes at least one pair of permanently meshing gears.

7. The transmission according to claim 6 wherein the hydraulic drive motor includes a motor drive shaft which, when the third one of the plurality of power-shift clutch devices is engaged, is coupled directly to the second input member.

8. The transmission according to claim 6 wherein there is a hydrostatic drive train which includes a gear which is carried by a motor drive shaft of the hydraulic drive motor, and the gear being fixed to rotate with the motor drive shaft, the gear being connected via at least one permanently meshing gear of the hydrostatic drive train to a hydrostatic drive train lay shaft, the third one of the plurality of power-shift clutch devices, when engaged, coupling the hydrostatic drive train lay shaft to the second input member to effect hydrostatic drive.

9. A method of operating a transmission for a vehicle which includes a ground engaging structure driven from an output member of the transmission, the transmission including a first input member connected to a prime mover, and a second input member drivable by the operation of a variable capacity hydraulic drive motor provided with hydraulic fluid to drive the motor from a variable capacity hydraulic pump which is drivable by the prime mover, and the transmission being operable to transmit drive from the first input member to the output member in mechanical drive mode, and from the second input member to the output member in hydrostatic drive mode, the first input member providing a drive input from the prime mover to a mechanical drive train which includes a gear ratio selection apparatus, and for mechanical drive mode, the gear ratio selection apparatus providing for one of a plurality of alternative gear ratios to be selected by the engagement or disengagement of each of a plurality power-shift clutch devices, and the second input member being connected via a drive path to the output member, the mechanical drive train including a gear fixed to rotate with the first input member and which is in permanent mesh with a gear fixed to rotate with a first lay shaft, a first one of the plurality of power-shift clutch devices being engageable to connect the first lay shaft to a drive shaft, the drive shaft having a gear fixed to rotate with the drive shaft and in permanent mesh with a gear fixed to rotate with a second lay shaft, and a second one of the plurality of power-shift clutch devices being engageable to connect the second lay shaft to the first input member, and there being a third one of the plurality of power-shift clutch devices between the hydraulic drive motor and the second input member which is operative when the transmission is in hydrostatic drive mode, to transmit drive established by the operation of the hydraulic drive motor to the second input member, the method including operating the transmission in hydrostatic drive mode with the power-shift, hydrostatic drive, clutch device engaged and no gear ratio selected by the gear ratio selection apparatus, and while the vehicle is still traveling, selecting a gear ratio of the mechanical drive train by engaging or disengaging at least one power-shift clutch device of the gear ratio selection apparatus and disengaging the power-shift, hydrostatic drive, clutch device and continuing to drive the vehicle, in mechanical drive mode.

* * * * *